(12) United States Patent
Nowaczyk

(10) Patent No.: US 7,950,506 B2
(45) Date of Patent: May 31, 2011

(54) SEMI THIRD TUBE DESIGN

(75) Inventor: Mark Nowaczyk, Genk (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 973 days.

(21) Appl. No.: 11/888,079

(22) Filed: Jul. 31, 2007

(65) Prior Publication Data

US 2009/0032346 A1 Feb. 5, 2009

(51) Int. Cl.
*F16F 9/34* (2006.01)
(52) U.S. Cl. .................. 188/266.6; 188/322.2; 188/315
(58) Field of Classification Search .............. 188/266.6, 188/315, 322.2, 318, 266.1, 266.2, 266.4, 188/266.5, 286
See application file for complete search history.

(56) References Cited

U.S. PATENT DOCUMENTS

| | | | | |
|---|---|---|---|---|
| 3,559,776 A | * | 2/1971 | Schultze | 188/300 |
| 4,054,277 A | * | 10/1977 | Sirven | 267/35 |
| 5,148,896 A | * | 9/1992 | Ralph | 188/314 |
| 5,195,619 A | * | 3/1993 | Dourson et al. | 188/282.4 |
| 5,472,070 A | * | 12/1995 | Feigel | 188/266.6 |
| 5,586,627 A | | 12/1996 | Nezu et al. | |
| 5,588,510 A | * | 12/1996 | Wilke | 188/266.6 |
| 6,321,888 B1 | * | 11/2001 | Reybrouck et al. | 188/322.2 |
| 6,427,986 B1 | | 8/2002 | Sakai et al. | |
| 6,464,048 B1 | * | 10/2002 | Groves et al. | 188/266.6 |
| 6,527,093 B2 | * | 3/2003 | Oliver et al. | 188/322.2 |
| 2005/0056504 A1 | | 3/2005 | Holiviers | |
| 2005/0121268 A1 | | 6/2005 | Groves et al. | |
| 2007/0000743 A1 | * | 1/2007 | Naitou et al. | 188/322.2 |

FOREIGN PATENT DOCUMENTS

| | | |
|---|---|---|
| JP | 2007-506055 | 3/2007 |
| KR | 10-2000-0055863 A | 9/2000 |

OTHER PUBLICATIONS

Internation Search Report from corresponding PCT Application No. PCT/US2008/008740 dated Jan. 23, 2009.
Written Opinion from corresponding PCT Application No. PCT/US2008/008740 dated Jan. 23, 2009.

* cited by examiner

*Primary Examiner* — Xuan Lan Nguyen
(74) *Attorney, Agent, or Firm* — Harness, Dickey & Pierce, PLC

(57) ABSTRACT

A shock absorber has an external valve that controls the damping loads for the shock absorber. The external valve extends generally parallel with the axis of the shock absorber and is attached to the reserve tube of the shock absorber. The inlet to the external valve is in communication with an intermediate chamber which is in communication with the working chamber of the shock absorber. The outlet of the valve is in communication with the reserve chamber of the shock absorber. The external valve controls the damping loads in both a compression and an extension stroke of the shock absorber.

12 Claims, 4 Drawing Sheets

SEMI THIRD TUBE DESIGN

FIELD

The present disclosure relates to a hydraulic damper or shock absorber for use in a suspension system such as suspension system used for automotive vehicles. More particularly, the present disclosure relates to a hydraulic damper or shock absorber having an externally mounted electromagnetic control valve. The externally mounted electromagnetic control valve is attached directly to the reserve tube and extends in a direction parallel to the axis of the reserve tube.

BACKGROUND

The statements in this section merely provide background information related to the present disclosure and may not constitute prior art.

A conventional hydraulic damper or shock absorber comprises a cylinder which is adapted at one end for attachment to the sprung or unsprung mass of a vehicle. A piston is slidably disposed within the cylinder with the piston separating the interior of the cylinder into two fluid chambers. A piston rod is connected to the piston and extends out of one end of the cylinder where it is adapted for attachment to the other of the sprung or unsprung mass of the vehicle. A first valving system is typically incorporated within the piston functions during the shock absorber's extension stroke of the piston with respect to the cylinder to create a damping load. A second valving system typically incorporated within the piston in a mono-tube design and in the base valve assembly in a dual-tube design functions during the shock absorber's compression stroke of the piston with respect to the cylinder to create a damping load.

Various types of adjustment mechanisms have been developed to generate damping forces in relation to the speed and/or amplitude of the displacement of the sprung or unsprung mass. These adjustment mechanisms have mainly been developed to provide a relatively small or low damping characteristic during the normal steady state running of the vehicle and a relatively large or high damping characteristic during vehicle maneuvers requiring extended suspension movements. The normal steady state running of the vehicle is accompanied by small or fine vibrations of the unsprung mass of the vehicle and thus the need for a soft ride or low damping characteristic of the suspension system to isolate the sprung mass from these small vibrations. During a turning or braking maneuver, as an example, the sprung mass of the vehicle will attempt to undergo a relatively slow and/or large movement or vibration which then requires a firm ride or high damping characteristic of the suspension system to support the sprung mass and provide stable handling characteristics to the vehicle. These adjustable mechanisms for the damping rates of a shock absorber offer the advantage of a smooth steady state ride by isolating the high frequency/small amplitude excitations from the unsprung mass while still providing the necessary damping or firm ride for the suspension system during vehicle maneuvers causing low frequency/large excitations of the sprung mass. Often, these damping characteristics are controlled by an externally mounted control valve.

The continued development of shock absorbers includes the development of adjustment systems which provide the vehicle designer with a continuously variable system which can be specifically tailored to a vehicle to provide a specified amount of damping in relation to various monitored conditions of the vehicle and its suspension system as well as being able to be packaged within the vehicle when space for the system is limited.

SUMMARY

A shock absorber according to the present disclosure includes a pressure tube defining a working chamber. A piston is slidably disposed on the pressure tube within the working chamber and the piston divides the working chamber into an upper working chamber and a lower working chamber. A reserve tube surrounds the pressure tube to define a reserve chamber. An intermediate tube is disposed between the reserve tube and the pressure tube to define an intermediate chamber. An external control valve is secured to the reserve tube such that the external valve assembly is disposed generally parallel to the axis of the reserve tube. The external control valve is in communication with the intermediate chamber and the reserve chamber. An inlet to the control valve is in communication with the intermediate chamber and an outlet of the control valve is in communication with the reserve chamber. The control valve generates different pressure flow characteristics for the damper or shock absorber which controls the damping characteristics for the damper or shock absorber. The different pressure-flow characteristics are a function of the current supplied to the control valve.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
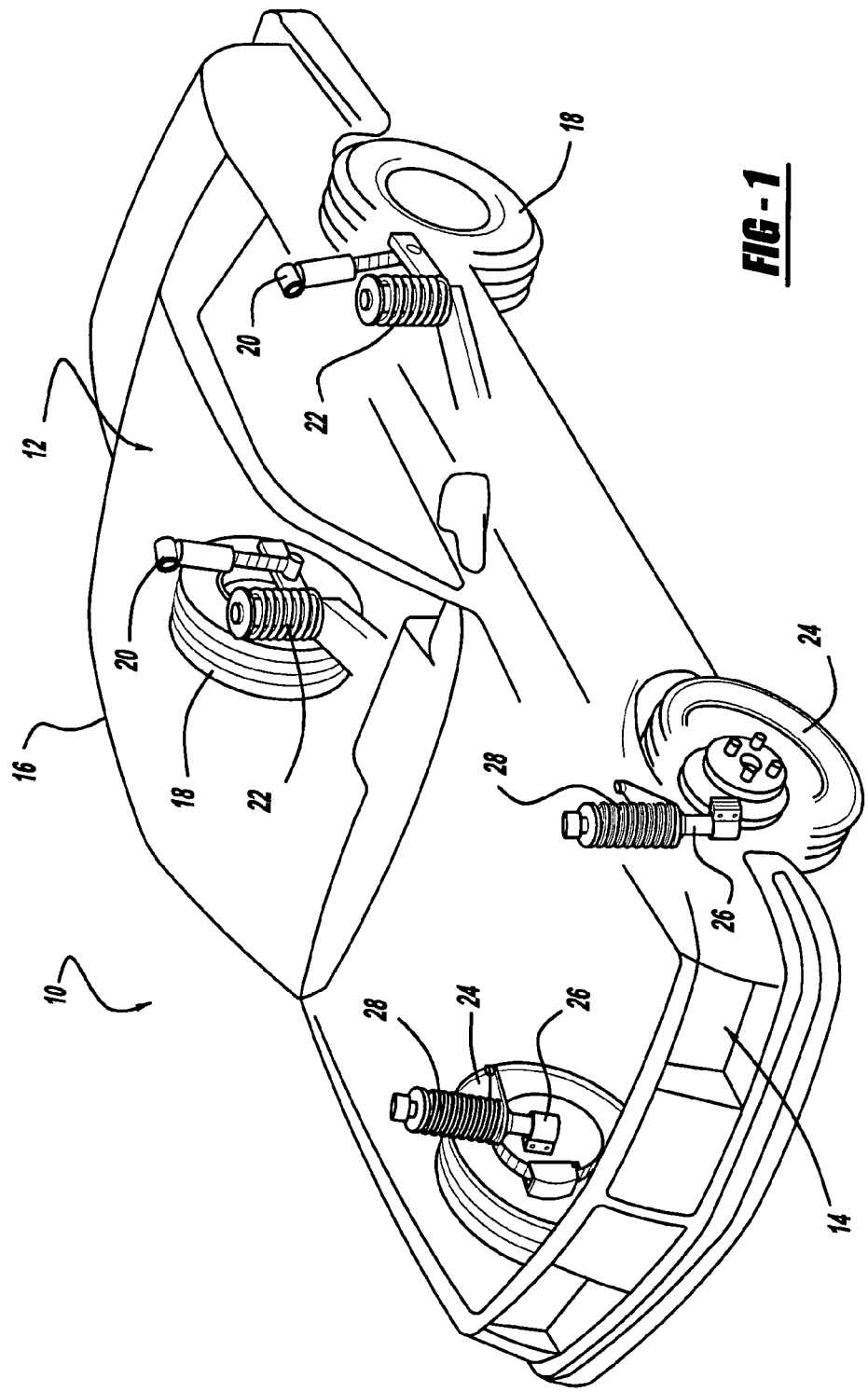
FIG. 1 illustrates an automotive vehicle which incorporates shock absorbers in accordance with the present disclosure.

The following description is merely exemplary in nature and is not intended to limit the present disclosure, application, or uses. Referring now to the drawings in which like reference numerals designate like components throughout the several views, there is shown in FIG. 1 a vehicle incorporating a suspension system having shock absorbers in accordance with the present disclosure, and which is designated by the reference numeral 10.

Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) to operatively support a pair of front wheels 24. The front axle assembly is attached to body 16 by means of a pair of shock absorbers 26 and by a pair of springs 28. Shock absorbers 20 and 26 serve to dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
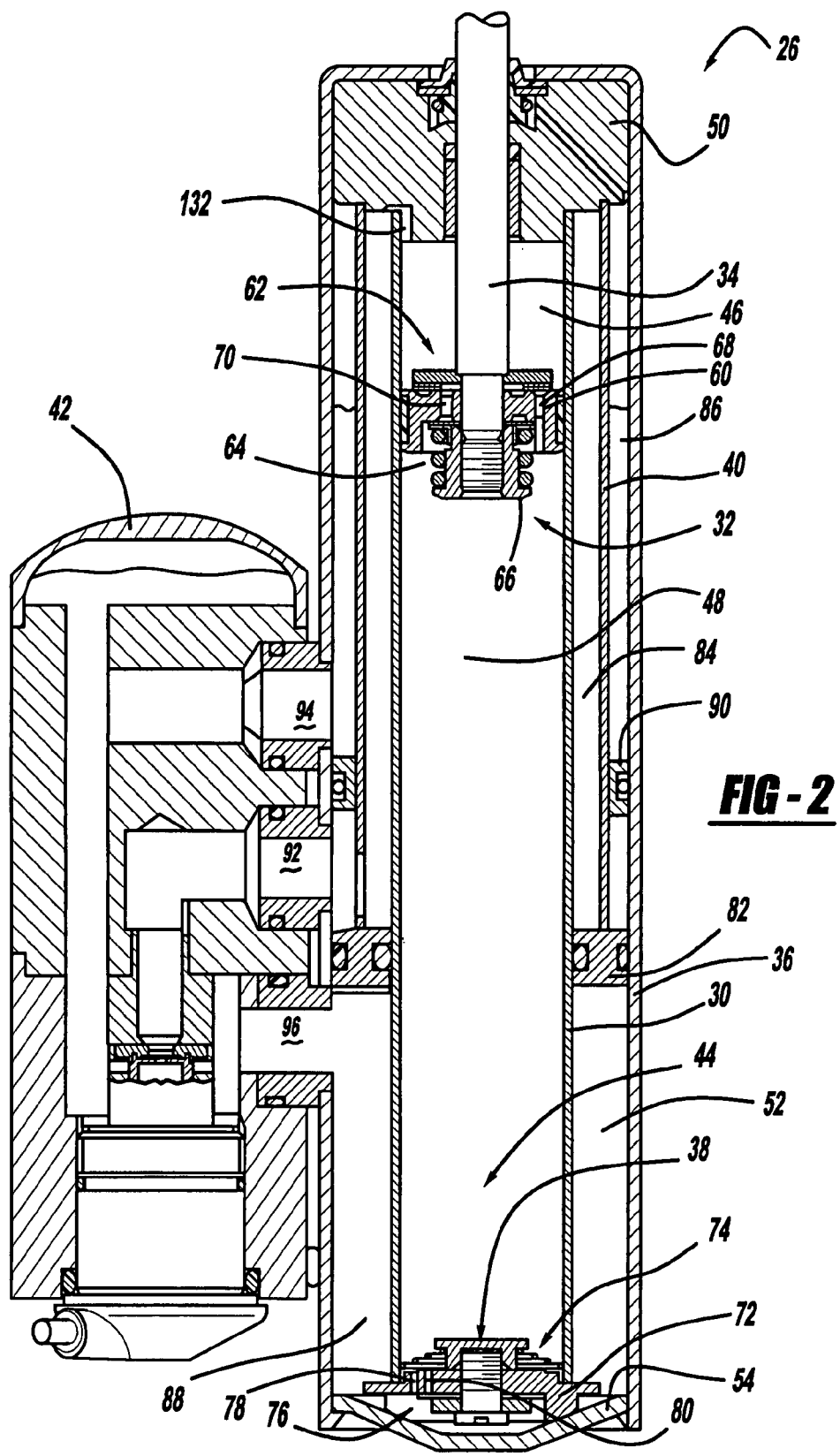
FIG. 2 is a cross-sectional side view of one of the shock absorbers illustrated in FIG. 1.

Referring now to FIG. 2, shock absorber 26 is shown in greater detail. While FIG. 2 illustrates only shock absorber 26, it is to be understood that shock absorber 20 also includes the control valve design described below for shock absorber 26. Shock absorber 20 only differs from shock absorber 26 in the manner in which it is adapted to be connected to the sprung and unsprung masses of vehicle 10. Shock absorber 26 comprises a pressure tube 30, a piston assembly 32, a piston rod 34, a reserve tube 36, a base valve assembly 38, an intermediate tube 40 and an externally mounted control valve 42.

Pressure tube 30 defines a working chamber 44. Piston assembly 32 is slidably disposed within pressure tube 30 and divides working chamber 44 into an upper working chamber 46 and a lower working chamber 48. A seal is disposed between piston assembly 32 and pressure tube 30 to permit sliding movement of piston assembly 32 with respect to pressure tube 30 without generating undue frictional forces as well as sealing upper working chamber 46 from lower working chamber 48. Piston rod 34 is attached to piston assembly 32 and extends through upper working chamber 46 and through an upper rod guide assembly 50 which closes the upper end of pressure tube 30. A sealing system seals the interface between upper rod guide assembly 50, reserve tube 36 and piston rod 34. The end of piston rod 34 opposite to piston assembly 32 is adapted to be secured to the sprung mass of vehicle 10. Because piston rod 34 extends only through upper working chamber 46 and not lower working chamber 48, extension and compression movements of piston assembly 32 with respect to pressure tube 30 causes a difference in the amount of fluid displaced in upper working chamber 46 and the amount of fluid displaced in lower working chamber 48. The difference in the amount of fluid displaced is known as the "rod volume" and during extension movements it flows through base valve assembly 38. During a compression movement of piston assembly 32 with respect to pressure tube 30, valving within piston assembly 32 allow fluid flow from lower working chamber 48 to upper working chamber 46 and the "rod volume" of fluid flow flows through control valve 42 as described below.

Reserve tube 36 surrounds pressure tube 30 to define a fluid reserve chamber 52 located between tubes 30 and 36. The bottom end of reserve tube 36 is closed by a base cup 54 which is adapted to be connected to the unsprung mass of vehicle 10. The upper end of reserve tube 36 is attached to upper rod guide assembly 50. Base valve assembly 38 is disposed between lower working chamber 48 and reserve chamber 52 to control the flow of fluid from reserve chamber 52 to lower working chamber 48. When shock absorber 26 extends in length, an additional volume of fluid is needed in lower working chamber 48 due to the "rod volume" concept. Thus, fluid will flow from reserve chamber 52 to lower working chamber 48 through base valve assembly 38 as detailed below. When shock absorber 26 compresses in length, an excess of fluid must be removed from lower working chamber 48 due to the "rod volume" concept. Thus, fluid will flow from lower working chamber 48 through piston assembly 32, through control valve 42 to reserve chamber 52 as detailed below.

Piston assembly 32 comprises a piston body 60, a compression valve assembly 62 and an extension valve assembly 64. A nut 66 is assembled to piston rod 34 to secure compression valve assembly 62, piston body 60 and extension valve assembly 64 to piston rod 34. Piston body 60 defines a plurality of compression passages 68 and a plurality of extension passages 70. Base valve assembly 38 comprises a valve body 72, an extension valve assembly 74 and a compression valve assembly 76. Valve body 72 defines a plurality of extension passages 78 and a plurality of compression passages 80.

During a compression stroke, fluid in lower working chamber 48 is pressurized causing fluid pressure to react against compression valve assembly 62. Compression valve assembly 62 acts as a check valve between lower working chamber 48 and upper working chamber 46. The damping characteristics for shock absorber 26 during a compression stroke are controlled by control valve 42 alone and possibly by control valve 42 working in parallel with base valve assembly 38 as described below. Control valve 42 controls the flow of fluid from lower working chamber 48 to upper working chamber 46 to control valve 42 to reserve chamber 52 due to the "rod volume" concept during a compression stroke as discussed below. Compression valve assembly 76 controls the flow of fluid from lower working chamber 48 to reserve chamber 52 during a compression stroke. Compression valve assembly 76 can be designed as a safety hydraulic relief valve, a damping valve working in parallel with control valve 42 or compression valve assembly can be removed from base valve assembly 38. During an extension stroke, compression passages 68 are closed by compression valve assembly 62.

During an extension stroke, fluid in upper working chamber 46 is pressurized causing fluid pressure to react against extension valve assembly 64. Extension valve assembly 64 is designed as either a safety hydraulic relief valve which will open when the fluid pressure within upper working chamber 46 exceeds a predetermined limit or as a typical pressure valve working in parallel with control valve 42 to change the shape of the damping curve as discussed below. The damping characteristics for shock absorber 26 during an extension stroke are controlled by control valve 42 alone or by control valve 42 in parallel with extension valve assembly 64 as discussed below. Control valve 42 controls the flow of fluid from upper working chamber 46 to reserve chamber 52. Replacement flow of fluid into lower working chamber 48 during an extension stroke flows through base valve assembly 38. Fluid in lower working chamber 48 is reduced in pressure causing fluid pressure in reserve chamber 52 to open extension valve assembly 74 and allow fluid flow from reserve chamber 52 to lower working chamber 48 through extension passages 78. Extension valve assembly 74 acts as a check valve between reserve chamber 52 and lower working chamber 48. The damping characteristics for shock absorber 26 during an extension stroke are controlled by control valve 42 alone and possibly by extension valve assembly 64 in parallel with control valve 42 as described below.

Intermediate tube 40 engages upper rod guide assembly 50 on an upper end and it extends partially through reserve chamber 52 to engage a double-sided sealing ring 82 to define an intermediate chamber 84. Double-sided sealing ring 82 sealingly engages pressure tube 30, reserve tube 36, control valve 42 and intermediate tube 40 and divides reserve chamber 52 into an upper reserve chamber 86 and a lower reserve chamber 88. A second single-sided sealing ring 90 sealingly engages intermediate tube 40, reserve tube 36 and control valve 42. A fluid inlet 92 in communication with intermediate chamber 84 is defined between double-sided sealing ring 82 and single-sided ring 90, a first fluid outlet 94 in communication with upper reserve chamber 86 is defined between double-sided sealing ring 82 and reserve tube 36 and a second fluid outlet 96 in communication with lower reserve chamber 88 is defined between single-sided sealing ring 90 and reserve tube 36.

Figure 3:
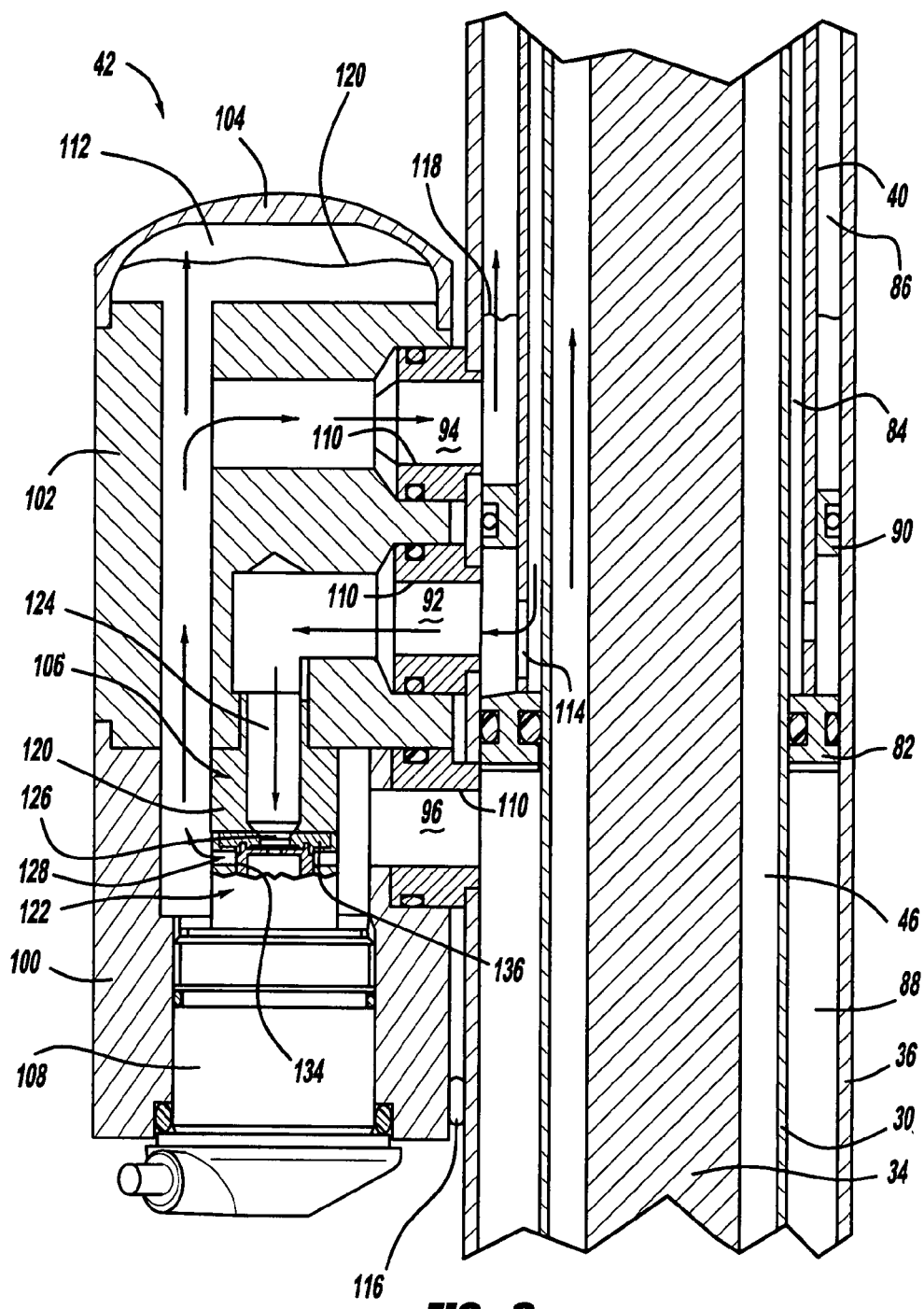
FIG. 3 is an enlarged cross-sectional side view of the externally mounted control valve illustrated in FIG. 2 showing fluid flow in a compression stroke.
Figure 4:
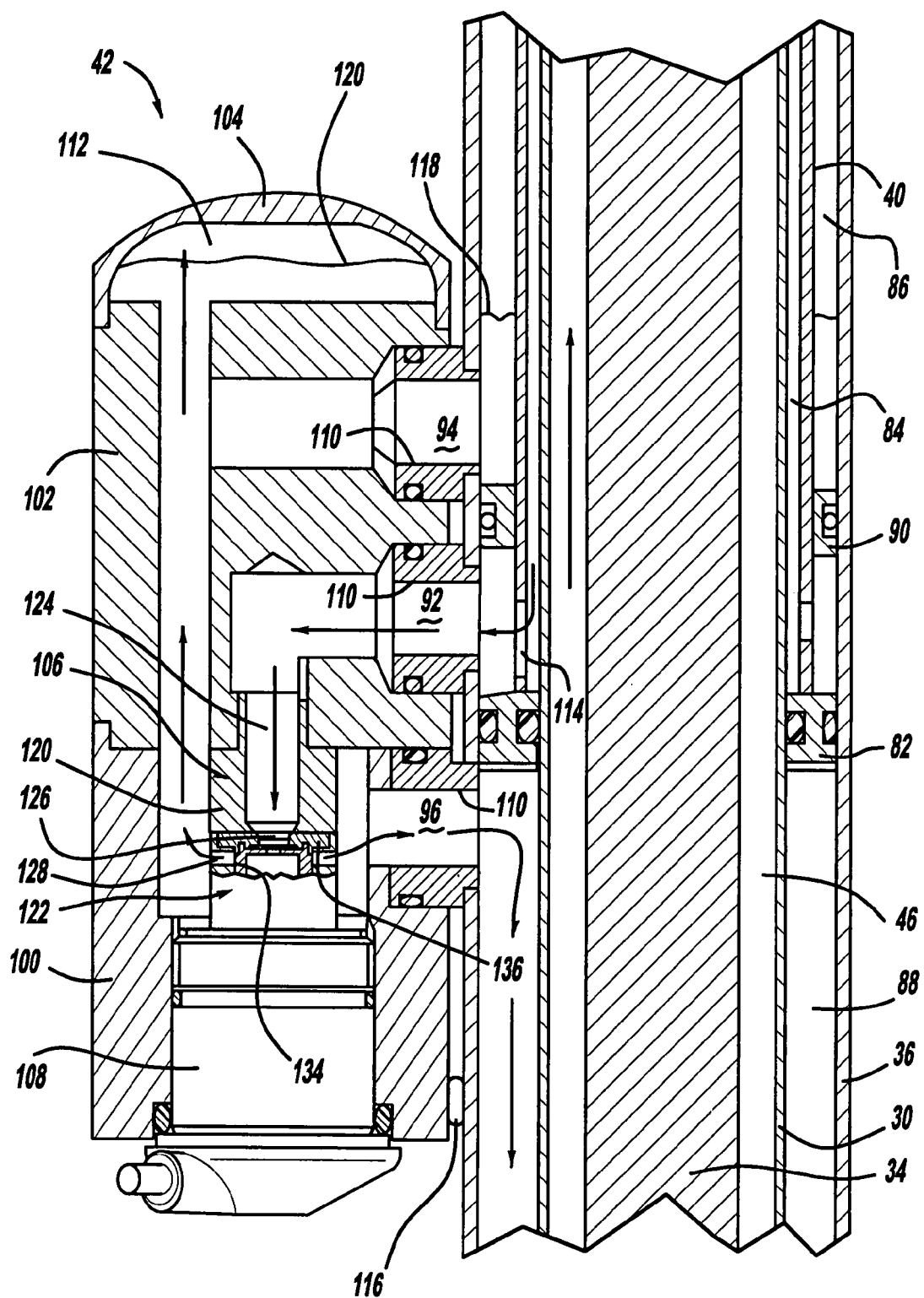
FIG. 4 is an enlarged cross-sectional side view of the externally mounted control valve illustrated in FIG. 2 showing fluid flow in an extension stroke.

Referring now to FIGS. 3 and 4, control valve 42 is illustrated in greater detail. Control valve 42 comprises a lower valve housing 100, an upper valve housing 102, a housing cap 104, a valve assembly 106, a solenoid valve assembly 108, and three transfer rings 110. Lower valve housing 100 is attached to upper valve housing 102. Housing cap 104 is attached to upper valve housing 102 to define a second reserve chamber 112.

Control valve 42 is secured to reserve tube 36 using the three transfer rings 110. One transfer ring 110 defines first fluid outlet 94, a second transfer ring 110 defines fluid inlet 92 and the third transfer ring 110 defines second fluid outlet 96. Fluid inlet 92 is in communication with intermediate chamber 84 through a plurality of holes 114 extending through intermediate tube 40. An additional weld indicated at 116 can be utilized to secure control valve 42 to reserve tube 36 if necessary. First fluid outlet 94, second fluid outlet 96 and fluid inlet 92 must always be located as low as possible so they are always under the fluid level in upper reserve chamber 86 indicated by reference numeral 118. This will avoid the creation of foam which has a negative influence on the working of shock absorber 26.

Valve assembly 106 and solenoid valve assembly 108 are disposed within the assembly of lower valve housing 100, upper valve housing 102 and housing cap 104. Valve assembly 106 includes a valve seat 120 and solenoid valve assembly 108 includes a valve body assembly 122. Valve seat 120 defines an axial bore 124 which receives fluid from fluid inlet 92. Valve body assembly 122 defines an axial bore 126 and a plurality of radial passages 128 which communicate with first fluid outlet 94, second fluid outlet 96, and second reserve chamber 112. First fluid outlet 94 is in communication with upper reserve chamber 86 and second fluid outlet 96 is in communication with lower reserve chamber 88.

Referring to FIG. 3, the operation of shock absorber 26 will be described when control valve 42 alone controls the damping loads for shock absorber 26 during a compression stroke. During a compression stroke, compression valve assembly 62 will open to allow fluid flow from lower working chamber 48 to upper working chamber 46. Due to the "rod volume" concept, fluid in upper working chamber 46 will flow to upper reserve chamber 86 as detailed below.

First, a small amount of fluid, the bleed flow, will flow through at least one bleed passage (not shown) extending through upper rod guide assembly 50 into upper reserve chamber 86. Once the bleed flow has reached its maximum fluid flow, the main fluid flow, will flow through a passageway 132 formed in upper rod guide assembly 50 and into intermediate chamber 84. The fluid will flow from intermediate chamber 84 through the plurality of holes 114 into fluid inlet 92. The higher or main flow damping characteristics for shock absorber 26 are determined by the configuration of valve assembly 106 and solenoid valve assembly 108. As such, valve assembly 106 and solenoid valve assembly 108 are configured to provide a predetermined damping function which is controlled by the signal provided to solenoid valve assembly 108. The predetermined damping function can be anywhere between a soft damping function to a firm damping function based upon the operating conditions of vehicle 10. At low piston velocities, control valve 42 remains closed and fluid flows through the bleed passages. At higher piston velocities, as fluid flow increases, fluid pressure against a plunger 134 of valve body assembly 122 will separate plunger 134 of valve body assembly 122 from a valve seat 136 of valve body assembly 122 and fluid will flow between plunger 134 of valve body assembly 122 and valve seat 136 of valve body assembly 122, through radial passages 128, through first fluid outlet 94 to upper reserve chamber 86 and into second reserve chamber 112 as illustrated by the arrows in FIG. 3. The fluid level in second reserve chamber 112 is indicated by reference numeral 120. The damping characteristics for shock absorber 26 during a compression stroke will be controlled by the design of valve assembly 106, the design of solenoid valve assembly 108 and the amount of current supplied to solenoid valve assembly 108.

Referring to FIG. 4, the operation of shock absorber 26 will be described when control valve 42 alone controls the damping loads for shock absorber 26 during an extension stroke. During an extension stroke, compression valve assembly 62 will close to prohibit fluid flow from upper working chamber 46 to lower working chamber 48.

First, a small amount of fluid, the bleed flow, will flow through the at least one bleed passage extending through upper rod guide assembly 50 into upper reserve chamber 88. Once the bleed flow has reached its maximum fluid flow, the main fluid flow, will flow through passageway 132 formed in upper rod guide assembly 50 and into intermediate chamber 84. The fluid will flow from intermediate chamber 84 through the plurality of holes 114 into fluid inlet 92. The higher or main flow damping characteristics for shock absorber 26 are determined by the configuration of valve assembly 106 and solenoid valve assembly 108. As such, valve assembly 106 and solenoid valve assembly 108 are configured to provide a predetermined damping function which is controlled by the signal provided to solenoid valve assembly 108. The predetermined damping function can be anywhere between a soft damping function to a firm damping function based upon the operating conditions of vehicle 10. At low piston velocities, control valve 42 remains closed and fluid flows through the bleed passages. At higher piston velocities, as fluid flow increases, fluid pressure against plunger 134 of valve body assembly 122 will separate plunger 134 of valve body assembly 122 from valve seat 136 of valve body assembly 122 and fluid will flow between plunger 134 of valve body assembly 122 and valve seat 136 of valve body assembly 122, through radial passages 128, through second fluid outlet 96 to lower reserve chamber 88 and into second reserve chamber 112 as illustrated by the arrows in FIG. 4. The damping characteristics for shock absorber 26 during a compression stroke will be controlled by the design of valve assembly 106, the design of solenoid valve assembly 108 and the amount of current supplied to solenoid valve assembly 108.

What is claimed is:
1. A shock absorber comprising:
a pressure tube forming a working chamber;
a piston assembly slidably disposed within said pressure tube, said piston assembly dividing said working chamber into an upper working chamber and a lower working chamber;
a reserve tube disposed around said pressure tube;
an intermediate tube disposed between said pressure tube and said reserve tube, an intermediate chamber being defined between said intermediate tube and said pres- sure tube, a first reserve chamber being defined between said reserve tube and said pressure tube;

a first sealing ring disposed within said first reserve chamber, said first sealing ring dividing said first reserve chamber into an upper reserve chamber and a lower reserve chamber;

a valve assembly mounted to said reserve tube, said valve assembly having an inlet in communication with said intermediate chamber, a first outlet in communication with said upper reserve chamber and a second outlet in communication with said lower reserve chamber; and a base valve assembly disposed between said lower working chamber and said lower reserve chamber, said base valve assembly controlling fluid flow between said lower working chamber and said lower reserve chamber.

2. The shock absorber according to claim 1, wherein said valve assembly comprises a cylindrical housing defining a housing axis and said reserve tube defines a reserve tube axis, said housing axis being parallel to said reserve tube axis.

3. The shock absorber according to claim 2, wherein said housing axis is spaced from said reserve tube axis.

4. The shock absorber according to claim 1, wherein said valve assembly defines a second reserve chamber.

5. The shock absorber according to claim 4, wherein said valve assembly comprises a variable valve disposed between said inlet and said second reserve chamber.

6. The shock absorber according to claim 5, wherein said variable valve is disposed between said inlet and said outlets.

7. The shock absorber according to claim 1, wherein said valve assembly comprises a solenoid valve assembly.

8. The shock absorber according to claim 1, wherein said valve assembly comprises a variable valve disposed between said inlet and said outlets.

9. The shock absorber according to claim 1, further comprising a second sealing ring disposed within said first reserve chamber, said second sealing ring sealing said first reserve chamber from said intermediate chamber.

10. The shock absorber according to claim 9, wherein said inlet is disposed between said first and second sealing rings.

11. The shock absorber according to claim 1, further comprising a second sealing ring disposed within said upper reserve chamber, said second sealing ring sealing said upper reserve chamber from said intermediate chamber.

12. The shock absorber according to claim 11, wherein said inlet is disposed between said first and second sealing rings.

* * * * *